E. C. WATERMAN.
SCROLL-SAW.
No. 174,395.  Patented March 7, 1876.
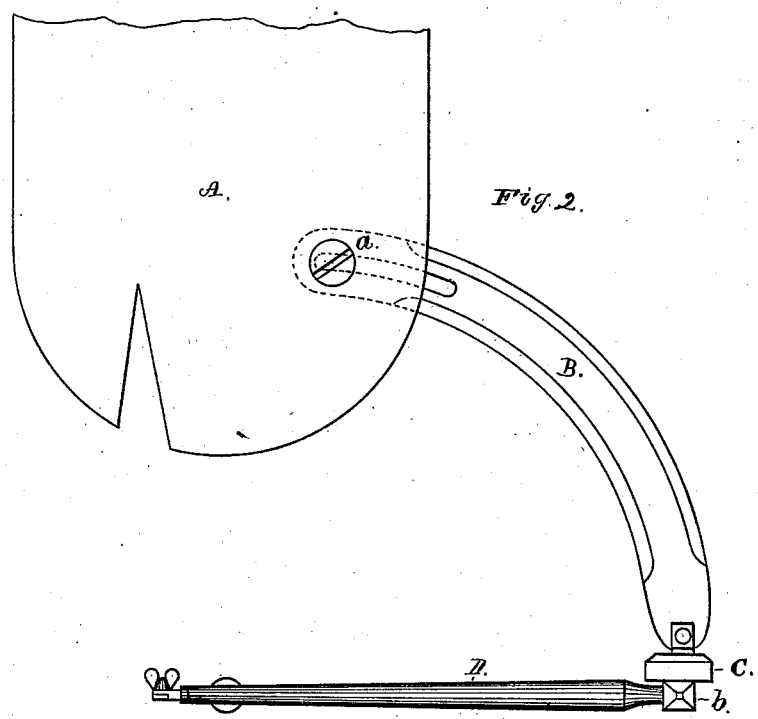
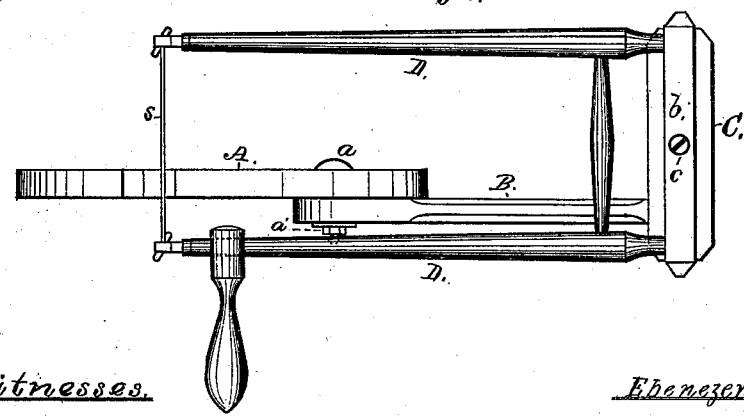

UNITED STATES PATENT OFFICE.

EBENEZER C. WATERMAN, OF HANOVER, MASSACHUSETTS.

IMPROVEMENT IN SCROLL-SAWS.

Specification forming part of Letters Patent No. 174,395, dated March 7, 1876; application filed February 11, 1876.

*To all whom it may concern:*

Be it known that I, EBENEZER C. WATERMAN, of Hanover, in the county of Plymouth and State of Massachusetts, have invented new and useful Improvement in Scroll-Saws; and I do hereby declare that the following is a full, clear, and exact description thereof, which will enable others skilled in the art to which it pertains to make and use the same, reference being had to the accompanying drawing, and to the letters of reference marked thereon, which form a part of this specification.

In the said drawing, Figure 1 denotes an end elevation, and Fig. 2 a top view, of a sawing apparatus constructed in accordance with my invention.

My invention has reference to that class of saws used in the production of fine ornamental work, the saw being operated by hand. Hitherto, in the production of such work by hand-sawing, the frame of the saw was of an open rectangular form, having the saw affixed at its outer end, and provided with a handle on its lower bar, by which the saw was operated.

In operating the saw the arm of the operator was passed through the frame, the rear bar thereof resting against his arm in order to steady the saw, while with his hand he imparted motion thereto. This method of holding and operating the saw is objectionable, as there is no positive means of maintaining the cut of the saw at right angles to the plane of the strip to be sawed, it being almost impossible with the greatest care and skill to produce a perfect perpendicularity of the saw so requisite in the production of fine artistic work.

The object of my invention is to remedy this objection, in carrying out which I provide a means by which the saw may be positively maintained in a plane perpendicular to the plane of the work; and my invention consists in the peculiar construction, combination, and arrangement of the parts of the apparatus, as hereinafter described and claimed.

In the drawing, A denotes the table for supporting the work while being sawed, the same having a slot formed through it for the passage of the saw. To the under face of this table is secured a curved arm, B, having a long longitudinal vertical slot near its outer end, a screw, $a$, passing down through the table and through the slot in the arm, and having a nut, $a'$, on its lower end, by which the arm may be clamped in any desired position. At the opposite end of this arm is jointed a vertical bar or guide, C, so arranged as to turn horizontally, such guide being so disposed that its front vertical face shall be in a plane at a right angle to the arm B, and perpendicular to the plane of the table A. To the said front face of the guide C the rear bar $b$ of the saw-frame D is affixed by means of a screw-pin, $c$, on which it turns as a pivot, the side of the bar impinging against the face of the guide, and thus serving to preserve the saw $s$ when in movement in an undeviating perpendicular plane, or planes.

From the above it will be evident that by the combination of the curved adjustable arm B and the hinged guide C with the table and the saw-frame, the saw may be readily moved into any desired position with reference to the working-slot in the table, and that under any such adjustment the path of movement of the saw must be in a plane perpendicular to the work, so that all the skill required in operating the saw is that requisite to move it up and down.

Having described my invention, what I claim is—

The improved sawing apparatus above described, consisting of the table A, the adjustable turning-arm B, the hinged guide-bar C, the saw $s$, and its frame D, pivoted to the bar C, the whole constructed, combined, and arranged substantially as shown and described.

In testimony that I claim the foregoing as my own invention I affix my signature in presence of two witnesses.

EBENEZER C. WATERMAN.

Witnesses:
D. A. SHERMAN,
R. C. WATERMAN.